United States Patent
Briand et al.

[11] Patent Number: 5,562,126
[45] Date of Patent: Oct. 8, 1996

[54] REINFORCED FLEXIBLE PIPE

[75] Inventors: Gérard Briand, Fresnes en Tardenois; Dominique Maingre, Vauxrezis; Marcel Le Foll, Pasly; Daniel Valtre, Soissons, all of France

[73] Assignee: Tubest, Fere en Tardenois, France

[21] Appl. No.: 395,874

[22] Filed: Feb. 28, 1995

[30]     Foreign Application Priority Data

Feb. 28, 1994  [FR]  France ................................ 94 02561

[51] Int. Cl.⁶ .................................................. F16L 11/00
[52] U.S. Cl. ................... 138/127; 138/123; 138/143; 138/144
[58] Field of Search ........................ 138/127, 123–126, 138/133, 134, 138, 143, 144, 153, 174

[56]             References Cited

U.S. PATENT DOCUMENTS 4,420,018  12/1983  Brown, Jr. .

FOREIGN PATENT DOCUMENTS 0465837  1/1992  European Pat. Off. .
1521729  4/1968  France .

*Primary Examiner*—Patrick Brinson
*Attorney, Agent, or Firm*—Oliff & Berridge

[57]             ABSTRACT

A reinforced flexible pipe includes an impermeable hose and a reinforcement tube composed of an interlacement of flat rovings wound helically about the axis of the hose. Each flat roving is constructed of a plurality of filaments, such as wires. The interlacement of the coaxial reinforcement tube includes metal tapes helically wound about the axis of the hose and interlaced with the flat rovings.

10 Claims, 2 Drawing Sheets

REINFORCED FLEXIBLE PIPE

The present invention relates to a reinforced flexible pipe as used for transporting fluids, either liquid or gaseous fluids, especially under pressure.

More precisely, the invention concerns reinforced flexible pipes comprising an impermeable hose and a coaxial reinforcement tube constituted by a tubular braid of bundles of filaments, especially wires. In general, this braid is composed of an interlacement of flat rovings helically wound about the axis of the hose, each flat roving comprising in a combined manner a plurality of wires side by side. In the flexible pipes considered by the present invention, the reinforcement tube is assembled, with respect to the impermeable hose, so as to have freedom of radial movement with respect to said hose.

The number of bundles or flat rovings of the reinforcement tube or tubular braid depends on the process or on the braiding machine used. In addition, the number of wires in each flat roving, the diameter and strength of the wires of which it is composed, as well as the braid angle or the angle of interlacing of the flat rovings with respect to each other, are chosen as a function of the final performance characteristics expected of the coaxial reinforcement tube.

The filaments of the flat rovings of the coaxial reinforcement tube or braid may be made of various metallic materials, such as steel, stainless steel, copper or copper alloy, or aluminum, but also of natural or man-made textile materials exhibiting good properties or mechanical strength.

A flexible pipe, as defined previously, enables, in general, fluids to be transported while allowing relative movement between the inlet and outlet of said pipe, along a line which may not be a linear one.

When the coaxial reinforcement tube or braid is arranged on the outside of the impermeable hose, this provides the following functions:

protection of the impermeable hose against external impacts;

burst strength of the impermeable hose, on internally pressurizing it;

retention of the external geometry of the flexible pipe;

damping of possible vibrations of the inner impermeable hose;

filtering possible audible emissions coming from the inside of the impermeable hose.

When the coaxial reinforcement tube or braid is arranged on the inside of the impermeable hose, this provides the following functions:

as previously, damping of possible vibrations and filtering of possible audible emissions, coming from the inside of the impermeable hose;

guiding the fluid transported by the impermeable hose, to limit the head losses, but also to prevent generation of audible or vibratory phenomena because of the contact between the fluid transported by the impermeable hose and the latter.

When the coaxial reinforcement tube or braid is employed on the inside of the impermeable hose, its inside diameter is liable to decrease under the effect of the flow of the fluid transported and because, on the one hand, of the elongation of the hose and, on the other hand, because of the temperature of the fluid transported, causing elongation of the wires constituting the braid and reduction in their mechanical characteristics. Under the combined effect of these various phenomena, the internal passage of the impermeable hose may become partially or completely blocked.

The object of the present invention is, in general, to improve the mechanical performance characteristics of the coaxial reinforcement tube or braid, both for use on the inside of the impermeable hose and on the outside of the same hose.

In accordance with the present invention, the interlacement of the coaxial reinforcement tube comprises metal tapes substituted for part of the flat rovings, distinct from the individual filaments of said rovings, individually wound helically around the axis of the reinforcement tube and therefore of the impermeable hose, interlaced and braided with the remaining flat rovings.

The term "metal tape" is meant any relatively narrow and relatively thin band of a metallic material, of the strip or flat type, for which the thickness is several times smaller than its width.

In practice, the metal tapes according to the invention may be substituted for at least part of the flat rovings of the reinforcement tube and be braided with said rovings; therefore the outside dimensions (width and thickness especially) of them are preferably comparable to those of the flat rovings.

The metal tapes according to the present invention must be distinguished from the filaments, possibly wires, loosely combined, respectively in the various flat rovings of the coaxial reinforcement tube, it being possible for these filaments to be individually flattened or to have a quadrilateral cross-section, as shown for example in the document U.S. Pat. No. 4,420,018.

Experience has demonstrated that incorporating metal tapes or bands, instead of flat rovings, into the interlacement of the coaxial reinforcement tube gives the latter better deformation resistance, while at the same time keeping the flexibility of the pipe and improving the capacity both to damp and filter the audible emissions or vibrations due to the presence of the coaxial reinforcement tube.

The metal tapes of the coaxial reinforcement tube may be made of any appropriate material, such as steel, stainless steel, copper or copper alloy, spring steel, etc.

The present invention is now described with reference to the appended drawing, in which.

In accordance with FIGS. 1 and 2, a reinforced flexible pipe 1 is depicted which comprises an impermeable hose 2 and a coaxial reinforcement tube 3, in the form of a tubular braid, arranged on the outside of the impermeable hose and at some distance from the latter, except at the two ends which are dealt with hereinbelow.

The impermeable hose 2 and the coaxial reinforcement tube 3 are crimped, for example onto two end fittings 8, at both ends of the pipe 1.

Figure 1:
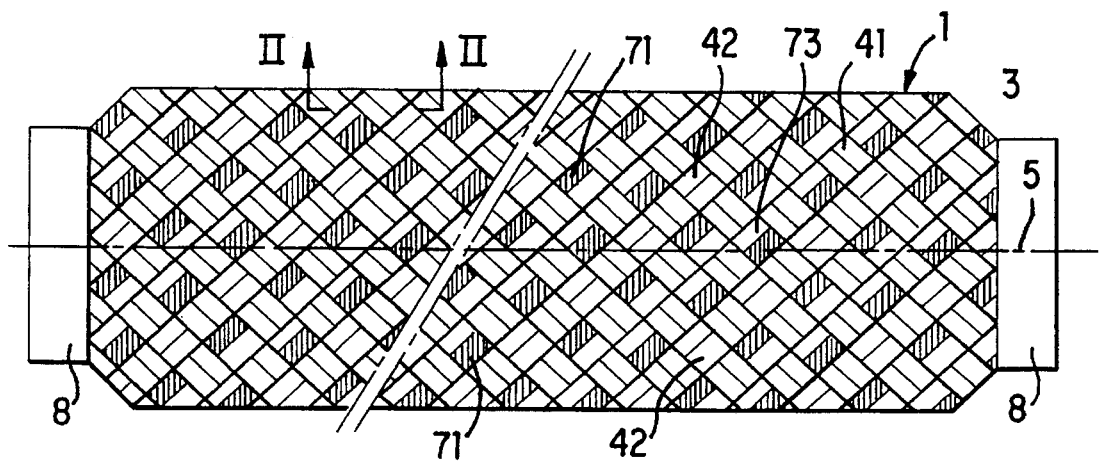
FIG. 1 depicts, as seen from the outside, a reinforced flexible pipe according to the invention.
Figure 3:
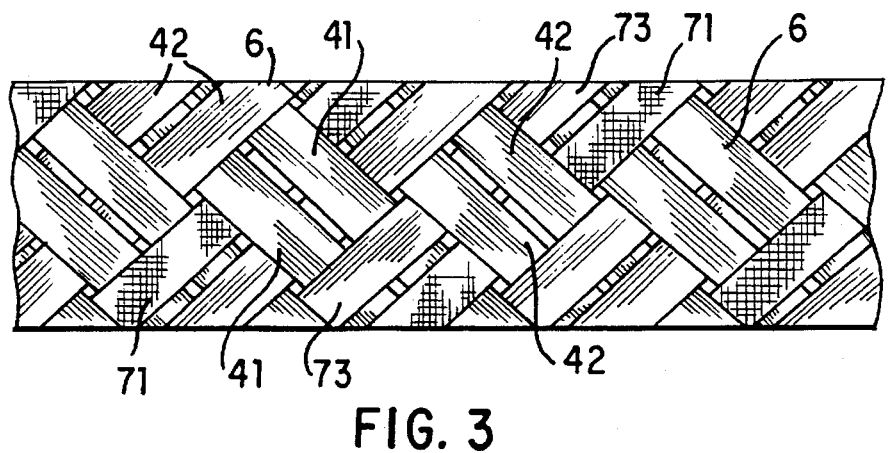
FIG. 3 depicts a detail, on an enlarged scale, of the reinforcement tube forming part of the pipe according to FIG. 1, showing the mode of interlacing of the tapes and of the flat rovings constituting it.

As shown in FIGS. 1 and 3, the reinforcement tube 3 comprises, in the form of an interlacement:

a first series of pairs of flat rovings 41 crossing successively, from the bottom to the top in FIG. 1, under a pair of flat rovings 42 of the second series, over a couple comprising a tape 71 and a roving 73 of the third series, under a pair of flat rovings 42 of the second series, and so on;

a second series of pairs of flat rovings 42 crossing successively, from the bottom to the top in FIG. 1, under a pair of flat rovings 41 of the first series, over a pair of flat rovings 41 of the first series, under a pair of flat rovings 41 of the first series, and so on;

a third series of couples comprising a flat roving 73 and a metal tape 71, crossing successively, from the bottom to the top in FIG. 1, under a pair of flat rovings 41 of the first series, over a pair of flat rovings 42 of the first series, under a pair of flat rovings 41 of the first series, and so on.

The flat rovings 41, 42 and 73 are constituted by a plurality of wires arranged side by side.

As shown in FIG. 3, each of the flat rovings 41, 42 and 73 is helically wound around the axis 5 of the impermeable hose 2, defining a certain angle with respect to said axis. The first series of couples of flat rovings 41 and the second series of couples of flat rovings 42 intersect at an angle called the braid angle. The third series of couples of metal tapes 71 and rovings 73 is wound parallel to the second series of flat rovings 42.

The flat rovings 41, 42 and 73 have substantially the same width and the same thickness as the metal tapes 71.

The number of metal tapes 71 braided into the reinforcement tube 3 is less than the total number of flat rovings 41 and 42 braided into the same tube.

Figure 4:
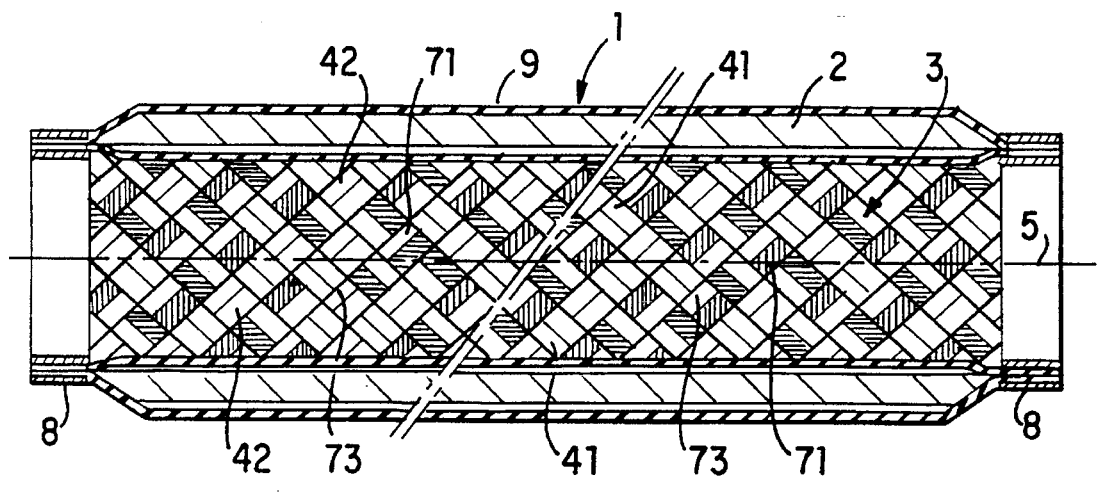
FIG. 4 depicts, in axial section, another reinforced flexible pipe according to the invention.
Figure 5:
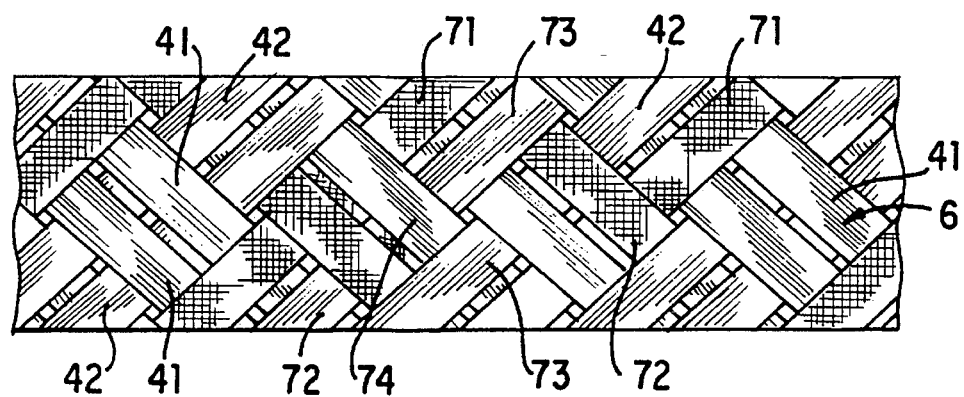
FIG. 5 depicts a detail, on an enlarged scale, of the coaxial reinforcement tube forming part of the pipe according to FIG. 4, showing the mode of interlacing of the flat rovings and of the tapes constituting it.

As shown in FIGS. 4 and 5, the reinforcement tube 3 comprises, in the form of an interlacement:

a first series of pairs of flat rovings 41 crossing successively, from the bottom to the top in FIG. 4, under a pair of flat rovings 42 of the second series, over a couple comprising a metal tape 71 and a flat roving 73 of the third series, under a couple comprising a flat roving 73 and a metal tape 71 of the third series, over a pair of flat rovings 42 of the second series, and so on;

a second series of pairs of flat rovings 42 crossing successively, from the bottom to the top in FIG. 4, under a pair of flat rovings 41 of the first series, over a couple comprising a metal tape 72 and a flat roving 74 of the fourth series, under a couple comprising a flat roving 74 and a metal tape 72 of the fourth series, over a pair of flat rovings 41 of the first series, and so on;

a third series of couples comprising a metal tape 71 and a roving 73 crossing successively, from the bottom to the top in FIG. 4, over a pair of flat rovings 41 of the first series, under a couple comprising a metal tape 72 and a flat roving 74 of the fourth series, over a couple comprising a flat roving 74 and a metal tape 72 of the fourth series, under a pair of flat rovings 41 of the first series, and so on;

a fourth series of couples comprising a metal tape 72 and a roving 74 crossing successively, from the bottom to the top in FIG. 4, under a pair of flat rovings 42 of the second series, over a couple comprising a metal tape 71 and a roving 73 of the third series, under a couple comprising a roving 73 and a metal tape 71 of the third series and over a pair of flat rovings 42 of the second series.

It will be noted that, according to FIGS. 4 and 5, and for the third and fourth series, from the bottom to the top, two metal tapes 71 or 72 flank two consecutive rovings 73 or 74.

Figure 2:
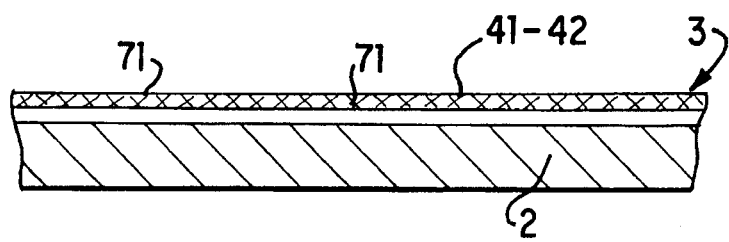
FIG. 2 depicts a longitudinal sectional view of the reinforced flexible pipe according to FIG. 1.

The flexible pipe depicted in FIGS. 4 and 5 differs, moreover, from that depicted with reference to FIGS. 1 to 3 by the following characteristics:

the reinforcement tube 3 is arranged on the inside of the hose 2 and another reinforcement tube 9 is arranged on the outside of the hose 2;

the interlacement of the tube 3 comprises, on the one hand, a first series of flat rovings 41 interlaced with a second series of flat rovings 42 and, on the other hand, a first series of tapes 71 wound parallel to one of the series of flat rovings 41 and interlaced with a second series of tapes 72 wound parallel to the other of the series of flat rovings 42; this arrangement enables the tapes 71 and 72 to be fastened together, if necessary, at their intersections or at some of them.

So as to demonstrate the performance characteristics of a reinforced flexible pipe according to the invention, compared to a conventional reinforced flexible pipe, and with a view to using said pipe for an exhaust line for the combustion gases of an internal combustion engine of a motor vehicle, the following experimental procedure has been employed:

1) TENSION/COMPRESSION TEST

These tests are carried out on the coaxial reinforcement tube alone, according to the following procedure 1.1) DEFINITION OF THE TEST SPECIMENS a) Reference reinforcement tube It is composed of 48 flat rovings or bundles, each consisting of ten filaments of 0.5 mm in diameter, braided with a braid pitch of 188 mm, a braid angle of 47.8° and a compactness of 0.86.

The wires of the rovings are made of 304 stainless steel having a tensile strength of 70 to 80 da N/mm$^2$.

b) Reinforcement tube according to the invention

Compared to the tube defined above, 4 flat rovings or bundles were replaced with 4 mutually interlaced metal tapes.

Each metal tape, having a width of 3.2 mm and a thickness of 0.5 mm, is obtained from 302 stainless steel having a tensile strength of 186 da N/mm$^2$ and an elongation at break of 3.1%.

c) test specimens

The reference tube and the reinforcement tube are cut to a length of 200 mm and crimped at each end between an inside ring and an outside ring.

A reference test specimen and a test specimen according to the invention are thus obtained.

1.2) PRETREATMENT OF THE TEST SPECIMENS

They are degreased and then oven-dried. Next, they are run in on an axial fatigue machine with which:

one end is held fixed and the other end moved by ±21 mm on either side of the axis of the tube with a frequency of 580 cycles/min and performing 3000 cycles 1.3) TENSION/COMPRESSION TEST With a stressing rate of 20 mm/min [sic], the two test specimens are subjected to the following tension/compression cycle:

compression to −20 mm tension to +20 mm compression to −20 mm tension to +20 mm compression to −20 mm tension to +20 mm return to zero elongation

1.4) RESULTS

For a stretch of 20 mm, the maximum force obtained in tension is 117N for the test specimen according to the invention and 80N for the reference test specimen, that is a gain of 46% in favour of the invention.

For a compression of 20 mm, the maximum force obtained is virtually the same, to within 5%, for both test specimens.

The frictional energies stored during a tension/ compression cycle are 1998 N.mm for the test specimen according to the invention and 1425 N.mm for the reference test specimen, that is a gain of 40% in favour of the invention.

1.5) COMMENTS

On account of the frictional energy defined above, a reinforcement tube according to the invention has damping properties superior to those of a conventional reinforcement tube.

2) VIBRATION MEASUREMENTS ON A MOTOR VEHICLE

2.1) DEFINITION OF THE TESTS

A first reinforced flexible pipe is composed of a corrugated metal hose, an external tube constituted by a conventional metal braid, and an internal reinforcement tube constituted by a seam-locked metal tube.

A second reinforced flexible pipe differs from the first pipe only by the internal reinforcement tube which is constituted according to the information of paragraph 1.1.*b*, and consequently according to the invention.

The two flexible pipes are tested successively on an exhaust line of a motor vehicle.

The level of vibration at one end of each pipe, on the opposite side from the engine, is measured with an accelerometer as a function of the speed of the engine.

2.2) RESULTS

At low speed (less than 1500 rpm), the two flexible pipes damp substantially to the same extent. At high speeds, the acceleration measured is less than 80 dB [sic] for the second pipe whereas it exceeds 85 dB [sic] with the first pipe.

2.3) COMMENT

In this particular, but not exclusive, application of the present invention, the latter enables the vibrations transmitted by the engine to the exhaust line of the motor vehicle to be significantly limited, over a wide range of speeds.

In addition, the invention makes it possible to maintain, over time, the damping properties of the second flexible pipe, compared to the first flexible pipe, for which the play between the seam-locking elements of the internal tube increases over time, because of wear.

Needless to say, depending on the performance characteristics required, especially in terms of damping, the interlacing, number and construction of the flat rovings and of the tapes may be varied and chosen appropriately.

We claim:

1. A reinforced flexible pipe, comprising:

an impermeable hose; and a coaxial reinforcement tube comprising an interlacement of flat rovings helically wound about an axis of the hose, each flat roving comprising a plurality of filaments combined together, and metal tapes distinct from the filaments of said flat rovings, wound individually around the axis of the hose, interlaced and braided with the flat rovings, the reinforcement tube being assembled, with respect to the impermeable hose, so as to have freedom of radial movement with respect to said impermeable hose.

2. The reinforced flexible pipe according to claim 1, wherein each of the flat rovings has a width substantially the same as a width of each of the metal tapes.

3. The reinforced flexible pipe according to claim 1, wherein each of the flat rovings has a thickness substantially the same as a thickness of each of the metal tapes.

4. The reinforced flexible pipe according to claim 1, wherein a total number of said metal tapes braided into the reinforcement tube is less than a total number of said flat rovings braided into said reinforcement tube.

5. The reinforced flexible pipe according to claim 1, wherein the interlacement of the reinforcement tube comprises:

a first series of flat rovings interlaced with a second series of flat rovings; and a first series of tapes wound parallel to one of the first and second series of flat rovings and interlaced with a second series of tapes wound parallel to another of the first and second series of flat rovings.

6. The reinforced flexible pipe according to claim 1, wherein at least one end of said reinforced pipe, the impermeable hose and the coaxial tube is crimped onto an end fitting.

7. The reinforced flexible pipe according to claim 1, wherein the reinforcement tube is arranged on an outside of the impermeable hose.

8. The reinforced flexible pipe according to claim 1, wherein the reinforcement tube is arranged on an inside of the impermeable hose.

9. The reinforced flexible pipe according to claim 8, wherein another reinforcement tube is arranged on an outside of the hose.

10. The reinforced flexible pipe according to claim 1, wherein said filaments of said flat rovings comprise wires.

\* \* \* \* \*